W. D. McNAULL.
WHEEL FOR VEHICLES.
APPLICATION FILED APR. 29, 1907.

899,699.

Patented Sept. 29, 1908.
2 SHEETS—SHEET 1.

WITNESSES:
Chas. K. Davies
Margaret Smith.

INVENTOR
William D. McNaull,
BY
Bartlett & Brock
Attorneys

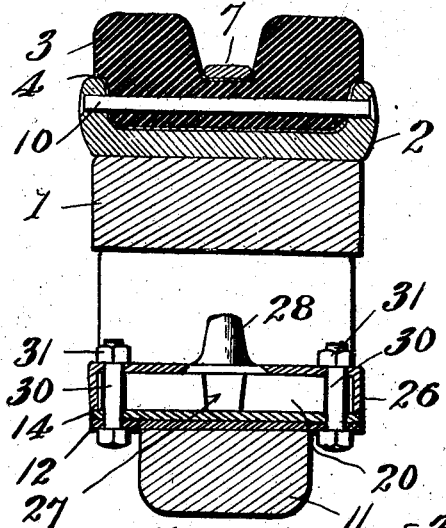
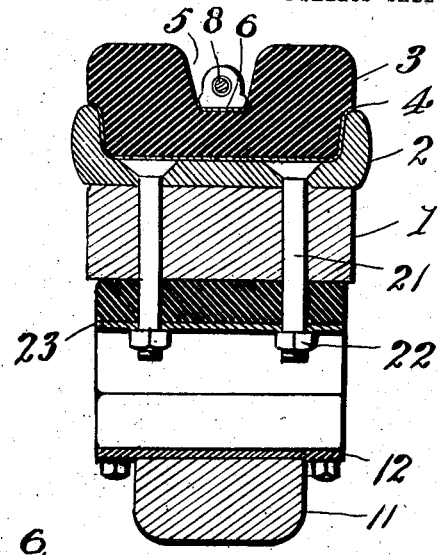
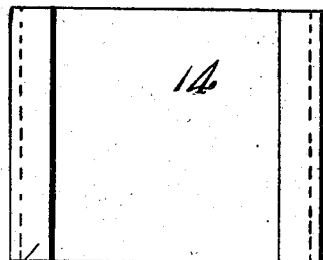
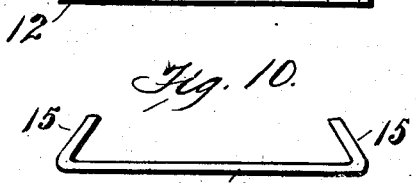
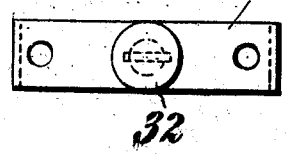
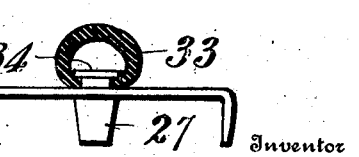

UNITED STATES PATENT OFFICE.

WILLIAM D. McNAULL, OF TOLEDO, OHIO.

WHEEL FOR VEHICLES.

No. 899,699.   Specification of Letters Patent.   Patented Sept. 29, 1908.

Application filed April 29, 1907. Serial No. 371,005.

*To all whom it may concern:*

Be it known that I, WILLIAM D. MCNAULL, a citizen of the United States, and a resident of Toledo, in the county of Lucas and State of Ohio, have invented a new and useful Improvement in Wheels for Vehicles, of which the following is a specification.

My invention relates to wheels for vehicles and especially for cushioning vehicle wheels without the use of pneumatic tires.

The invention consists in an improved exterior elastic tire and a novel cushioning device interposed between the outer and inner wheel rims.

Figure 1:
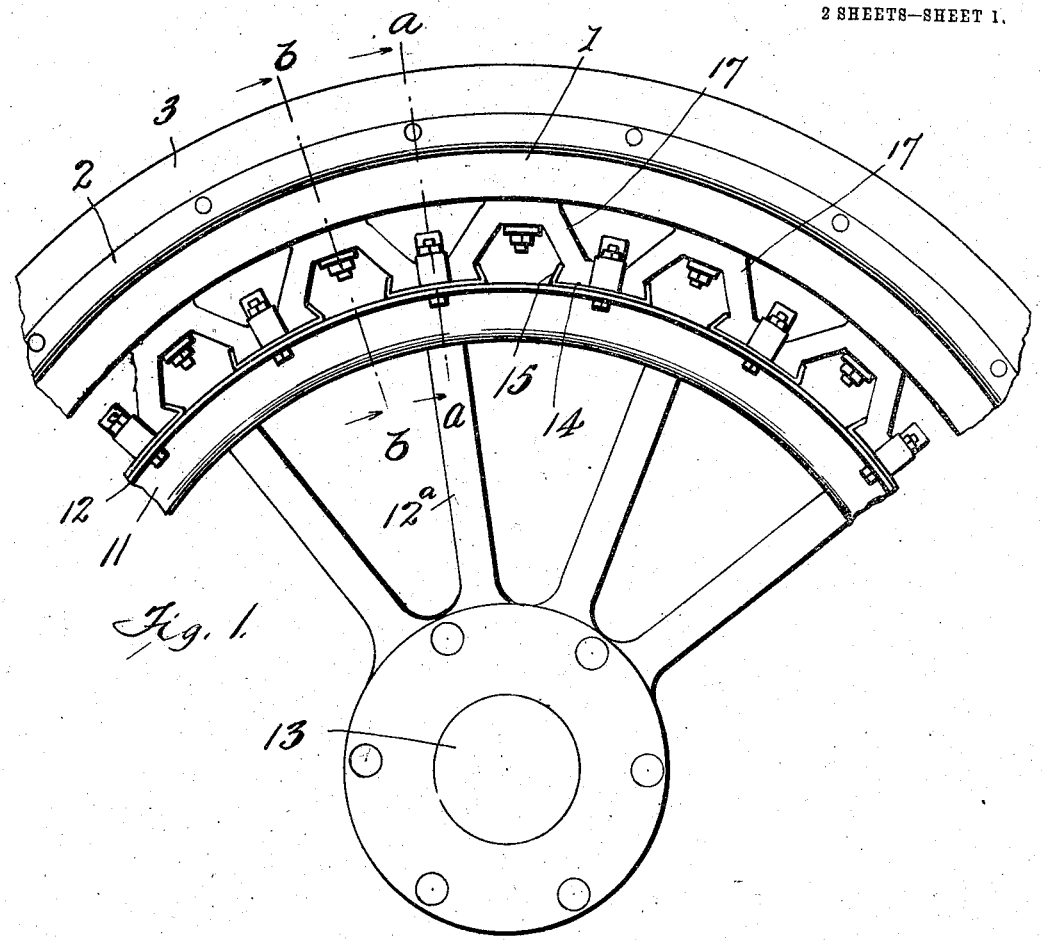
Figure 2:
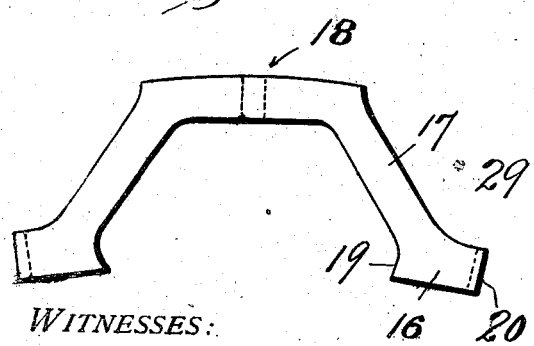
Figure 3:
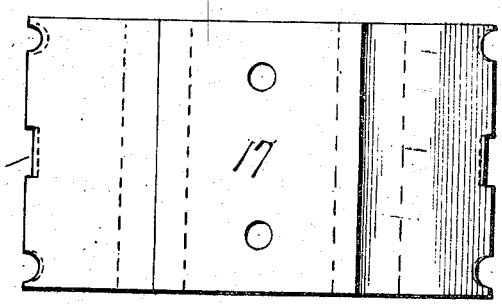

The characteristics and advantages of the invention are hereinafter pointed out in connection with the detailed description of the accompanying drawing, which illustrates and exemplifies structures embodying the invention and in which Figure 1 is a side elevation of a segment of the wheel embodying the invention. Fig. 2 is a detailed elevation of one of the cushion sections; Fig. 3, a plan view of Fig. 2; Fig. 4 is a transverse section on the line $a-a$, Fig. 1. Fig. 5 is a transverse section on the line $b-b$, Fig. 1. Fig. 6 is a detail of the clamping device for the tire. Fig. 7 is a detail of a clamp and buffer. Fig. 8 is a plan view of Fig. 7. Fig. 9 is a plan view of a chair. Fig. 10 is an elevation of Fig. 9. Fig. 11 is a modified form of clamp and buffer.

The outer felly 1 carries a channeled metal rim 2, in the channel of which is the elastic tire 3, usually of rubber composition. The tire is preferably reinforced on its inner surface with canvas 4, and is formed with a central, exterior depression or groove 5, the bottom of which is also reinforced with the canvas 6. The tire may be endless, and in this case, is stretched sufficiently to pass over the flanges of the channeled rim or may be divided transversely to facilitate placing in position. When in the rim the tire is secured by a metal band 7, lying in recess 5 upon the canvas. This band may be tightened or secured in position by any suitable means. An example of a fastening device is shown in Fig. 6, consisting of bolt and nut 8, engaging ears 9, provided on the band.

To further secure the tire and prevent creeping, etc., a number of holes are drilled transversely through the flanges of the channeled rim and tire and through the holes are passed rivets 10, which are headed up at each end to prevent displacement.

The fastening devices provided hold the tire securely in the rim and absolutely prevent bulging or creeping. The central recess in the tire affords means for applying the retaining band 7, and in addition provides a double tread which effectually resists tendency to side slipping and also provides other advantages well understood in the art which have heretofore been attained, in some cases, by the provision of two independent tires on the felly.

Lying within the outer felly 1 and separated from it a suitable distance is inner felly 11, connected by spokes $12^a$ to the hub 13, in the usual manner. Felly 11 is surrounded by the metal band 12 which protrudes beyond the felly. Between the two fellies is placed a cushioning device which serves, in addition to the tire, to absorb road shocks and driving strains, and this device will now be particularly described.

A plurality of chairs 14 are placed upon the band 12. These chairs have bases curved to fit the band and end flanges 15 turned up and somewhat inwardly. These chairs accommodate the inner ends 16 of cushion sections 17, shown in detail in Figs. 2 and 3. The sections are composed of any suitable elastic or flexible material, such as rubber or rubber composition. The outer surfaces 18 of the sections rest upon the inner surface of the outer felly 1, and the ends 16 of the sections have their inner surfaces 19 shaped to conform to the flanges or hooks 15 of the chairs and their outer faces 20 squared off so that, when the sections are placed in the chairs, as seen in Fig. 1, the ends of the two adjacent sections fill one of the chairs. The sections are secured to the outer felly by means of bolts 21 passing through the felly and nuts 22, plates 23 being preferably placed between the nuts and the sections. In addition to clamping the sections to the outer felly, bolts 21 may conveniently serve to secure the channeled rim 2 and the felly, as shown in Fig. 5.

The sections are secured in the chairs by bolts and nuts or other suitable devices. A preferred form of fastening will now be described.

24 are clamps each consisting of a flat strip 25 having downwardly curved ends forming flanges 26, a central prong 27, and an outward projection 28 serving as a buffer. The clamps are put in position as shown in Fig. 4, with the flat strip uppermost and resting on the adjoining ends of the sections, the flanges 26 lying outside the sections and resting upon the bases of the chairs 14. The adjoining ends of the sections are cut away, as shown at 29, Fig. 3, so as to accommodate the prong 27. The bolts 30, one at each side of each of the joints, pass through the metal band 12, chair 14, through the sections at their joining, and through the clamps, and all these parts are drawn together by nuts 31 on the bolts.

In operation, when the wheel encounters inequalities in the road surface, the flexible sections 17 yield, effectually cushioning the shocks. The driving reaction, weight of the vehicle and road shocks are carried not only by the sections at the top of the wheel but by those at the bottom and sides. In other words, the cushioning device acts both under tension and compression. By varying the proportions and number of the sections used, the invention may be adapted to any character or weight of vehicle, whether horse-drawn or propelled by motor.

The exterior projections 28 upon clamps 25 serve as buffers which encounter the outer felly and prevent excessive relative movement of the two fellies. In some cases it is preferred to provide the buffers with rubber or other flexible caps 32 (Fig. 7), or the buffers may consist of tubular sections of rubber or other suitable material 33 secured to the clamps by studs 34, as seen in Fig. 11.

The structures shown and described exemplify certain forms in which my invention may be embodied, but I contemplate many changes in construction which may be made without departing from the spirit of the invention.

What I claim is:

1. A cushion wheel for vehicles comprising an inner and an outer felly, a plurality of chairs on one of the fellies and a plurality of substantially V-shaped flexible sections, each having its ends secured in adjoining chairs together with the ends of the adjoining sections, and having its middle portion secured to the opposite felly.

2. In a cushion wheel the combination of an inner and an outer felly, a plurality of chairs on one of the fellies, a plurality of V-shaped flexible cushion sections connected centrally to one of the fellies and each having its ends secured in adjacent chairs, and clamping devices securing the adjacent ends of each pair of the sections in their chair.

3. In a cushion wheel the combination of an inner rim, a metal band thereon protruding at the sides, an outer rim, chairs resting on the band having hook-shaped ends, flexible V-shaped cushion sections secured centrally to the outer rim and having their ends resting in the chairs, clamps resting on the adjoining ends of the sections and having inwardly extending ends overlapping the sections and resting on the chairs, and bolts passing through the clamps, chairs and band and holding the parts in place.

4. In a cushion wheel the combination of an inner rim, a metal band thereon protruding at the sides, an outer rim, chairs resting on the band having hook-shaped ends, flexible V-shaped cushion sections secured centrally to the outer rim and having their ends resting in the chairs, clamps resting on the adjoining ends of the sections and having inwardly extending ends overlapping the sections and resting on the chairs, bolts passing through the clamps, chairs and band and holding the parts in place, and buffers carried by the clamps extending toward the outer rim.

WILLIAM D. McNAULL.

Witnesses:
 D. HARRY HARPSTER,
 ERNEST CONRAD.